United States Patent [19]

Liang et al.

[11] Patent Number: 5,719,215
[45] Date of Patent: Feb. 17, 1998

[54] TREATMENT OF RUBBER TO FORM BITUMINOUS COMPOSITIONS

[75] Inventors: Zhi-zhong Liang; Raymond T. Woodhams, both of Toronto, Canada

[73] Assignee: Polyphalt L.L.C., Salt Lake City, Utah

[21] Appl. No.: 464,874

[22] PCT Filed: Dec. 29, 1993

[86] PCT No.: PCT/CA93/00562

§ 371 Date: Sep. 12, 1995

§ 102(e) Date: Sep. 12, 1995

[87] PCT Pub. No.: WO91/14896

PCT Pub. Date: Jul. 7, 1994

[30] Foreign Application Priority Data

Dec. 29, 1992 [GB] United Kingdom ............ 9227035

[51] Int. Cl.$^6$ .................................................. C08L 95/00
[52] U.S. Cl. ..................................................... 524/62
[58] Field of Search ......................................... 524/62

[56] References Cited

U.S. PATENT DOCUMENTS

| | | | |
|---|---|---|---|
| 4,166,049 | 8/1979 | Huff | 524/62 |
| 4,412,864 | 11/1983 | Kurashige et al. | 524/76 |
| 5,114,648 | 5/1992 | Kuc, Sr. | 524/62 |
| 5,304,576 | 4/1994 | Martinez | 524/62 |
| 5,380,773 | 1/1995 | Bellio et al. | 524/59 |

FOREIGN PATENT DOCUMENTS

| | | |
|---|---|---|
| 439 232 | 7/1991 | European Pat. Off. . |
| 2 507 192 | 12/1982 | France .................. 524/62 |

*Primary Examiner*—Fredrick Krass
*Attorney, Agent, or Firm*—Sim & McBurney

[57] ABSTRACT

The present invention provides a procedure for at least partial dissociation of crumb rubber vulcanate network, including automobile tires, and for the incorporation of this treated rubber into stable bitumen compositions. The at least partially dissociated rubber vulcanate network may be used independently as a bitumen modifier, or a stabilizing agent for ground vulcanate rubber dispersions in bitumen or as a steric stabilizer in dispersion of polyolefins in bitumen. The at least partially dissociated rubber vulcanate network materials are produced in situ in bitumen or produced separately and subsequently incorporated into bitumen and the bituminous compositions are useful materials for a variety of applications. Modifications are possible within the scope of this invention.

41 Claims, No Drawings

TREATMENT OF RUBBER TO FORM BITUMINOUS COMPOSITIONS

FIELD OF INVENTION

The present invention relates to the treatment of vulcanate rubber, particularly scrap rubber from automobile tires as well as from other sources, to effect partial or high levels of dissociation of the rubber vulcanate network and the incorporation of such treated rubber into stable bituminous compositions.

BACKGROUND TO THE INVENTION

Motor vehicle tires represent a significant disposal problem and attempts have been made to recycle the same, for example, by incorporation of recycled ground rubber formed from such tires into various products, including asphalt compositions for roadway pavements. Such ground rubber is often identified by the term "rubber crumb" and that expression is employed herein.

Recycled rubber crumb generally contains a variety of rubber polymers, including styrene-butadiene rubber, natural rubber and its synthetic analog (cis-polyisoprene), cis-polybutadiene, butyl rubber and EPDM rubber. Often such recycled rubber crumb comprises predominantly styrene-butadiene rubber.

A search of the prior art in the facilities of the United States Patent and Trademark Office has located the following United States patents related to the reclaiming of rubber from vulcanized rubber waste, including automobile tires:

| | |
|---|---|
| 1,168,230 | 1,133,952 |
| 1,981,811 | 2,645,817 |
| 3,880,807 | 3,896,059 |
| 4,161,464 | 4,146,508 |
| 4,469,817 | 5,095,040 |

These patents relate to a variety of mechanical, chemical and mixed mechanical and chemical procedures.

Crumb rubber generally is recycled rubber that has been reduced to ground or particulate form by mechanical shearing or grinding. A variety of procedures have been used to reclaim materials from ground scrap rubber, one of the most common being an alkali process in which ground rubber is treated in aqueous sodium hydroxide solution at elevated temperature. Other reclaiming processes involve treatment of ground rubber in processing oils using various combinations of high temperature and excessive shear for the purpose of producing liquified materials which may be incorporated into the manufacture of new tires or used directly as fuel oil.

In addition, it has been proposed that scrap crumb rubber be incorporated into asphalt paving materials. In general, crumb rubber may be incorporated into asphalt paving materials by one of two processes, namely a wet process or a dry process.

In the wet process, the crumb rubber is blended into the asphalt cement, by batch blending in which batches of crumb rubber and asphalt are mixed in production, by continuous blending with a continuous production system, or by terminal blending. An asphalt cement binder that has been modified with crumb rubber is termed asphalt rubber. In the dry process, the rubber crumb is added to heated aggregate, not the asphalt cement, or hot mix asphalt mixture during production of the mix.

In one such wet procedure, hot asphalt (about 190° to 220° C.) is mixed with approximately 25 to 30 wt % crumb and the mixture then is diluted with kerosene. A variation of this procedure uses about 22 wt % crumb with dilution being effected using extender oil. It is thought that blending the crumb rubber and asphalt at elevated temperature may promote limited chemical bonding of the components. However, these compositions exhibit only short-term stability and, therefore, must be employed shortly after formation.

A recent variation of the wet process is contained in U.S. Pat. No. 4,992,492. The process involves a mixture of asphalt or sulfur-treated asphalt (81 to 86%), crumb rubber (8 to 10%), extender oil (4 to 6%) and a high molecular weight (>100,000) olefinically-unsaturated synthetic rubber (2 to 3%) which is blended together at 175° to 180° C. for about two hours.

As claimed, this process differs from the present invention in a number of important facets. In the referenced process the ground crumb rubber is dispersed in the bitumen, however, the vulcanate network undergoes limited, if any, chemical disassociation. Such crumb rubber compositions would be unstable without the incorporation of the claimed high MW ($\geq 100,000$) olefinically unsaturated synthetic rubber. The high MW free solvated synthetic rubber chains likely act to minimize changes in viscosity and softening point over periods of up to 10 days in "a hermetically-sealed vessel without agitation at 160° to 165° C.".

In recently-published WO 93/17076, ground rubber particles are heavily oxidized, particularly at the surface of the particles, with air injected under pressure at a high temperature (220° to 260° C.), in a procedure similar to that employed conventionally for producing an oxidized or "blown" asphalt for roofing-grade asphalt. Such treatment of the fine rubber particles in situ improves desired rubber dispersibility and compatibility, but also may impart undesirable brittleness to the asphalt matrix.

The incorporation of crumb rubber from recycled automobile and other tires into bitumen or asphalt is desirable in view of the potentially improved properties of composition attained thereby and the recycle of scrap rubber achieved thereby.

SUMMARY OF INVENTION

In accordance with the present invention, partial or high levels of dissociation of rubber crumb network, particularly crumb rubber from recycled automobile tires, or other sources of scrap rubber, is effected and the incorporation of the products of such treated rubber into bitumen to produce stable bituminous materials useful in a variety of applications, as described in more detail below, thereby incorporating the original scrap rubber into useful products. In particular, particulate rubber material may be dispersed in bitumen in a manner which resists separation of a stable dispersed particulate rubber phase, particularly provided by crumb rubber from recycled automobile tires.

According to one aspect of the invention, there is provided a method of forming a bituminous composition, which comprises mixing rubber vulcanate particles with a hydrocarbon oil to effect softening and swelling of the rubber particles, applying thermal energy and mechanical energy to the softened and swollen particles to effect at least partial dissociation of the vulcanate network, dispersing the at least partially liquified rubber particles in bitumen, providing at least one compatibilizing agent in the bitumen to incorporate treated rubber from the at least partially dissociated rubber vulcanates into the bitumen, and, if necessary, cross-linking the compatibilizing agent, bitumen and treated rubber including any residual rubber particles to stabilize the residual rubber particles against separation from the bitumen by sedimentation.

The present invention also provides, in another aspect, a bituminous composition comprising a continuous bitumen phase and a dispersed phase comprising dissociated rubber vulcanate network. Such composition then may provide the vehicle for providing a bituminous composition containing a dispersed phase, including rubber particles, which may be partially dissociated as described herein, or particulate polyolefins, in which case the particles are stabilized against separation from the bitumen by cross-linking.

In a further embodiment of the present invention, the at least partially dissociated rubber vulcanate network may be used as a steric stabilizer to prevent phase separation of dispersed polyolefins from hot liquid asphalt.

GENERAL DESCRIPTION OF INVENTION

The term "bitumen" used herein has its conventional technical meaning and means a class of black or dark-colored (solid, semi-solid or viscous) cementitious substances, natural or manufactured, composed principally of high molecule weight hydrocarbons of which asphalts, tars, pitches and asphalites are typical. The term "asphalt" as used herein has its conventional technical meaning and means a dark, brown to black, cementitious material, solid or semi-solid in consistency, in which the predominant constituents are bitumen that occur in nature, as such, or are obtained as residue in petroleum refining. The bituminous material employed herein may arise from a variety of sources, including straight and vacuum residue, mixtures of vacuum residue with a variety of diluents, including vacuum tower wash oil, paraffin distillate and aromatic and naphthenic oils. Other aspbaltic materials, such as rock asphalt, naturally-occurring asphalt and coal tar pitch, also may be used.

The procedure of the present invention is applicable to any rubber product, whether synthetic or natural, vulcanized or non-vulcanized, and may be applied to one-component rubber materials or mixtures of two or more rubbers. The invention is particularly described for economic reasons with respect to crumb rubber from recycled automobile tires from a variety of sources, including whole tires, tires treads, tire baffins, whether automobile or truck tires, as well as from other industrial or commercial rubber waste.

The particle size of the crumb rubber which is processed herein may have a wide range, for example, from about % inch to about 200 mesh. Scrap automobile tire crumb conveniently may be sized from about 10 to about 80 mesh for utilization in the process of the invention. Preferably, the crumb rubber used in the invention is derived from recycled automobile tires and hence may comprise significant amounts of vulcanized synthetic styrene-butadiene rubber.

The crumb rubber is mixed with asphalt containing a hydrocarbon oil, as a swelling agent, and a synthetic liquid rubber, as a compatibilizer. Three different, yet related, embodiments of the present invention are provided. Each such embodiment may be effected by two alternative methods, one more preferred than the other. In the more preferred alternative, the process is carried out wholly in bitumen while in the less preferred alternative, the crumb rubber is processed separately from bitumen and only after processing are the products of such processing incorporated into bitumen.

In the alternative where the processing of the crumb is effected in bitumen, the bitumen itself may contain sufficient hydrocarbon oil component to effect the softening and swelling such that no further hydrocarbon oil need be added. In general, the hydrocarbon oils employed in the present application are those derived from petroleum or coal tar which are compatible with the products of the dissociation. The useful hydrocarbon oils may be variously described as naphthenic, aromatic or paraffinic, depending on the predominant structure of the oil. Preferably, the hydrocarbon oil employed has a high aromaticity, since such characteristic facilitates penetration of the oil into the surface of the crumb rubber particles and the softening and swelling of the structure. Particular aromatic oils which may be used herein include those available under the trade-names "SUNTEX" 790 AND 780T and "HYDROLENE" 80T, 90 and 125.

The crumb rubber is loaded in the bitumen containing the hydrocarbon oil over a wide concentration, generally from about 5 to about 75 wt %, which loading may be effected at one time or incrementally during processing of the crumb rubber. Generally, when the crumb rubber is dispersed in the bitumen hydrocarbon oil mixture at elevated temperature, some of the oil is taken up by the crumb rubber as penetration of the crumb rubber by the oil occurs. The quantity of crumb rubber which may be mixed initially with the oil should be such that a continuous oil phase remains following the initial mixing. The amount of hydrocarbon oil in the hydrocarbon oil/bitumen mixture may vary according to several factors, such as the level of oil present in the bitumen, desired performance characteristics and level of crumb rubber to be treated.

The crumb rubber particles then are subjected to thermal and mechanical energy to commence breakdown of the vulcanized rubber particles, through breakdown of sulfur—sulfur bonds and cross-links between polymer molecules. This process increases the solubility and compatibility of the at least partially dissociated rubber vulcanate network into the bituminous phase and also promotes the dissolved free liquid rubber chains, added as a compatibilizer, to chemically combine in-situ with the at least partially dissociated rubber vulcanate network. The conditions used for the dissociation of the vulcanized rubber particles depends on a number of factors, as discussed below. In particular, the temperature may range from about 100° to about 300° C. with mechanical energy being applied by shearing at a shear rate which may vary significantly depending on other processing parameters. For example, processing of the ground crumb rubber at lower temperatures may require use of higher shear rates while lower shear rates may be possible at more elevated temperatures. The heat and mechanical energy being applied over a period of time which may vary widely, from about 15 minutes to about 8 hours or more, depending on the components employed, processing parameters and the nature of the product desired.

In general, the process according to the present invention to effect at least partial dissociation of the crumb rubber vulcanate network is controlled by a number of variable factors, including type of hydrocarbon oil, initial concentration of oil in bitumen, process conditions employed, such as equipment type, shear rate, temperature and the interrelation of shear rate and temperature, the use of additional devulcanization agents, the timing of addition of crumb rubber, size and loading rates, amount and timing of addition of a cross-linking agent, as discussed below, and the molecular weight and type of the liquid rubber, as well as the functionality of the rubber, if applicable. By utilizing this combination of parameters, the degree of dissociation of the scrap rubber may be controlled to produce a variety of products, as described below.

The liquid rubber component employed in the present invention is highly soluble or highly compatibilized with liquid bituminous compositions under typical processing conditions, generally about 100° to 300° C., preferably about 150° to about 220° C. Such liquid rubber can serve to compatibilize bitumen with the ground rubber and also tends to penetrate the oil swollen crumb rubber and facilitate its mixing into the asphalt, thereby facilitating the in-situ chemical bonding of the liquid rubber with the at least partially dissociated rubber vulcanate network through free-radical chain transfer reaction.

Such liquid rubber may be functionalized or non-functionalized and preferably has a molecular weight in the range of about 300 to about 60,000 and preferably has a similar molecular structure (i.e. polybutadiene, polyisoprene or styrenic copolymers derived therefrom) to the scrap rubber in order to facilitate the physical and/or chemical incorporation of the at least partially dissociated rubber vulcanate network into the bitumen.

If a functionalized liquid rubber is used, the functional group may be an amine, diol, maleic anhydride, cyanide, carboxylic acid or sulfonate. Of such functional groups, amines are preferred, since such organic groups contain which, due to their basicity, can act as a catalyst to accelerate the dissociation process and also assist in the coupling reaction required to link other dispersed polymer particles, such as polyolefins, preferably polyethylene, if such particles are present in the bituminous composition.

When the process is carried out in bitumen having a low hydrocarbon oil content, it is preferred for the liquid rubber to be dissolved in the bitumen at the start of the process, although the liquid rubber may be added at any convenient stage of processing of the bitumen/rubber particle composition. When the process is carried out in hydrocarbon oil and then the at least partially dissociated rubber vulcanate network is added to bitumen, the liquid rubber usually also is added to the bitumen at the same time. In general, the amount of liquid rubber employed is about 0.01 to about 10 wt %, preferably about 0.1 to about 3 wt % of the bitumen.

The application of heat and mechanical energy to the dispersed swollen crumb rubber particles in the bitumen causes dissociation of the rubber vulcanate network and a continuous reduction in the rubber vulcanate particle size, the degree of particle size reduction depending on the length of time for which the thermal and mechanical energy are applied to the composition, in addition to the other process parameters discussed above. If such processing is effected for a sufficient duration, all the rubber particles become dissociated, so that there remain no discernible rubber particles in the composition.

However, if such processing is effected for a sufficient duration and without sufficient control that the rubber vulcanate network is heavily dissociated, an oil-like liquified material is produced, which may not be desirable for use in paving and roofing related applications. Such oil-like liquified materials may be better suited for use as a diluent in asphalt and non-asphalt based coatings and sealants.

Crumb rubber from automobile tires generally contains a significant proportion of carbon black. The dissociation procedure used herein tends to cause a release of carbon black particles. Typically, such carbon black particles would separate from the continuous bitumen phase, by means of sedimentation.

In the present invention, the stability of the released carbon black is improved through the surface grafting of the liquid rubber and the at least partially dissociated rubber vulcanate network onto these particles during free radical chain transfer reaction.

In general, the highly dissociated material may be dispersed in bitumen and remain in the liquid phase solely through the use of the liquid rubber component. However, at intermediate stages between the commencement of dissociation and the highly dissociated material where there remain dispersed degraded rubber particles, in order to provide a stable dispersion of such degraded rubber particles in bitumen, it is necessary for chemical reaction to be effected by way of cross-linking of the liquid rubber, in order for the degraded rubber particles to be stabilized against sedimentation from the bitumen.

An important aspect of the present invention is the ability to control the degree or level of dissociation of the rubber vulcanate network. Materials of certain levels of disassociation may be used independently or advantageously combined together.

The highly dissociated rubber vulcanate network which has been solubilized or compatibilized in the bitumen can subsequently be re-vulcanized in-situ through the use of commonly employed cross-linking agents. This revulcanized modified bitumen exhibits improved elasticity and stiffness without risk of phase separation due to irreversible chemical bonding into the bitumen.

Such cross-linking and/or grafting may be effected using any convenient cross-linking agent, including sulfur, sulfur donor, with or without accelerating additives, and other free-radical initiators, such as hydrogen peroxide. In general, the amount of cross-linking agent employed is about 0.05 to about 5 wt %, preferably about 0.2 to about 3 wt % of bitumen. The cross-linking agent may be added at any convenient stage of processing.

In another embodiment of the inveniton vulcanized crumb rubber particles may be added and incorporated into the above described highly dissociated rubberized asphalt composition. In such compositions the at least partially dissociated rubber network may chemically bind on the surface of the rubber vulcanate particles thereby creating stable compositions.

A stable bitumen composition is produced in the preferred aspect of the invention in which no phase separation of residual degraded crumb rubber from automobile tires and carbon black released from crumb rubber by the devulcanization occurs at elevated temperatures, generally in the range of about 100° to about 300° C.

Incremental loadings of crumb rubber particles may be employed to provide a very high loading of dispersed stabilized rubber in the product bitumen composition, generally in the range of about 25 to about 80wt %. Such concentrated material, or masterbatch, may be diluted with bitumen to form a composition containing a desired concentration of stabilized crumb rubber, generally in the range of about 3 to about 40 wt %, for a variety of asphalt applications, including all types of paving, preformed paving bricks, roofing membranes, shingles, waterproofing membranes, sealants, caulks, potting resins and protective finishes. Alternatively, such masterbatch may be compounded with fillers and/or polymers and the compounded composition may be pelletized to produce a pelletized composition for subsequent incorporation into asphalt compositions for such uses.

In our published International patent application WO 93/07219 the disclosure of which is incorporated herein by reference, there is described the provision of stable asphalt compositions in which polyethylene particles are maintained as a dispersed phase by steric stabilization. As described therein, the bitumen comprises the major continuous phase of the polymer-modified bitumen compositions and the polymer is dispersed in the bitumen by steric stabilization achieved by a first component anchored to the polymer phase and a second component bonded to the first component and soluble in the bitumen.

In addition, as described in copending UK patent application No. 9306517.5 filed Mar. 29, 1993, in the name of Polyphalt Inc, additional homopolymer or copolymer component, including styrenic copolymers, olefinic copolymers and E-P rubbers may be provided in the bitumen composition, in the form of particle dispersions, strand-like dispersions, solutions and combinations in which the additional homopolymer and copolymer components are stabilized against separation.

The at least partially dissociated rubber vulcanate network produced in the manner described above may be added, as is or stably dispersed in bitumen, to these bitumen compositions so that the residual rubber crumb particles form part of the stable dispersed phase and may provide supplementation to or partial replacement for the polyethylene or other polymer particles. The unsaturated components of the liquid rubber and such at least partially dissociated rubber vulcanate network may be employed to replace polybutadiene-based stabilizer, in whole or in part, as the steric stabilizer. If the unsaturated rubber, used in the production of the at least partially dissociated rubber vulcanate network is functionalized, then this unsaturated rubber can be used to replace the second component which is bonded to the first component and anchored to the dispersed polymer, as described above.

The formation of stable dispersions of crumb rubber in bitumen by the procedure employed herein may be combined with stabilization of dispersed polyethylene and other olefinic polymers and copolymers, as described above, to improve the characteristics thereof. Paving materials generally include aggregate, such as crushed stone pebbles, sand etc, along with the bitumen composition. Similarly, other additives to the bitumen composition may be employed, dependent on the end use to which the bituminous composition is put. For example, a roofing material may be obtained by the addition of suitable fillers, such as asbestos, carbonates, silica, wood fibres, mica, sulfates, clays, pigments and/or fire retardants, such as chlorinated waxes. For crack-filler applications, an oxide may be advantageously added.

EXAMPLES

Example 1

This Example illustrates the processing of rubber crumb to a dissociated rubber vulcanate network and the incorporation of such treated rubber into an asphalt composition.

Automobile tire rubber crumb of 20 mesh size was mixed with the aromatic oil "SUNTEX" 790. This oil is characterized by the physical and chemical properties shown in the following Tables I and II:

TABLE I

| Viscosity Range | | MED |
|---|---|---|
| Physical Properties | ASTM Method | 790 |
| Viscosity, SUS/100° F. | D2161 | 3500 |
| Viscosity, SUS/210° F. | D2161 | 96.3 |
| API Gravity, 60° F. | D287 | 11.0 |
| Specific Gravity, 60° F. | D1250 | 0.9979 |
| Viscosity - Gravity Constant | D2501 | 0.954 |
| Weight, lb/cal | D1250 | 8.27 |

TABLE I-continued

| Viscosity Range | | MED |
|---|---|---|
| Molecular weight | D2502 | 398 |
| Pour Point, °F. | D97 | +70 |
| Volatility - Wt. % @ 225° F. | D972 | 1.2 |
| Flash Point, COC. °F. | D92 | 420 |
| Refractive Index | D1747 | 1.5684 |
| Aniline Point | D611 | 97 |

TABLE II

| Clay-Gel. Wt. 5% | D2007 | |
|---|---|---|
| Asphaltenes | | 0.1 |
| Polar Compounds | | 10.4 |
| Aromatics | | 73.2 |
| Total Aromatics | | 83.6 |
| Saturates | | 16.3 |
| Carbon Type Analysis, % | D2140 | |
| Ca | | 37 |
| Cn | | 28 |
| Cp | | 35 |

Following an initial loading of 15 wt % of rubber crumb to the oil (i.e. a mixture of 15wt % rubber crumb, 85 wt % oil), the mixture was heated to about 180° C. under high shear conditions using a Brinkman Polytron high shear mixer with a 45H mixing head. Initially, the viscosity of the composition increased and then started to fall after about 20 minutes as dissociation of the oil swollen rubber network commenced. At this point, a loading of a further 10 wt % rubber was added to the liquid mass and the application of heat and shear forces continued. During the mixing, the temperature of the composition rose to a range of about 200° to 250° C. as a result of friction forces. The application of heat and shear forces continued for about 3 hours, at the end of which time the rubber vulcanate was heavily dissociated and dissolved in the oil. A further loading of 10wt % of rubber was added and the procedure repeated. At the end of about a further 0.5 hours, there was provided a highly dissolved mass comprising 35 wt % liquified rubber crumb and 65 wt % aromatic oil.

The procedure was continued employing a high shear which resulted in more and more incrementally added crumb rubber up to 65 wt % rubber crumb which was dissociated into aromatic oil solution, formed in about 6 hours.

To the treated rubber comprising 65wt % of dissolved rubber crumb and 35 wt % aromatic oil were added polybutadiene rubber (Ricoh 134, Colorado Chemical Specialities Inc. Microstructure 80% trans- and cis-1,4; 20% 1,2-vinyl, molecular wt (MW=12,000) in an amount of about 3 to 5 wt % of the amount of treated rubber crumb and sulfur in an amount of about 1 wt % of the amount of treated rubber crumb to the oil, and the resulting mixture was heated for about 1 hour at that temperature to form a cross-linked material.

The resulting cross-linked material was mixed with liquid asphalt (Petro-Canada Bow River, Penetration 85/100, see Table III below for properties) in an amount of 20 to 40% by weight of mixture to provide a compatible composition.

The asphalt/cross-linked material mixture was mixed with a stabilized asphalt composition as described in WO 93/07219 based on asphalt (Cold Lake 300 to 400 penetration) at an elevated temperature of 160° C. containing 4 wt % dispersed sterically-stabilized polyethylene and 2wt % polybutadiene. The asphalt/cross-linked material was added in amount corresponding to 2.5 wt % of the treated rubber crumb in the cross-linked material, for a total polymer content of the asphalt composition of 7.5 wt %.

Upon examination of the resulting asphalt composition, it was observed that the particle size of the polyethylene particles was decreased and the dispersion of polyethylene particles was more uniform in size than in the composition prior to addition of the asphalt/cross-linked material mixture. In addition, the elastic properties of the asphalt composition were enhanced.

Example 2

This Example provides a comparative Example using the conventional steps according to wet process.

In a 1 L mixing vessel, 84 parts of asphalt (Petro-Canada Bow River, Penetration 85/100, see Table III below for properties) were heated to 180° C. 10 wt % of crumb rubber (Baker Rubber Inc., 20 mesh) and 6 parts of aromatic oil (Sunrex 790, see Tables I and II above for properties) were added into the asphalt and dispersed under high shear (with a Brinkman Polytron Mixer for 2 hours at 180° C. to 240° C.

TABLE III

| Property | ASTM | Bow River 85/100 |
| --- | --- | --- |
| Viscosity at 135, CP | D4552 | 400 |
| Specific Gravity at 15° C. | D1298 | 1026 |
| Molecular Weight g/mol | D2502 | 1200 |
| Compositions (%) | D2007 | |
| Asphaltenes | | 10.3 |
| Total Aromatics | | 71.1 |
| Saturates | | 18.5 |

The mixture was stored in an oven at elevated temperature (at 140° C.) for 48 hours without agitation. Inspection of the mixture at the end of this period showed that almost all the crumb rubber which had been dispersed into the asphalt had sedimentated at the bottom section of the vessel. The viscosity of the asphalt at the bottom of the vessel was much higher than that at top. Such a rapid phase separation (or crumb rubber sedimentation) is seen from the storage stability test data in Table IV below.

Example 3

Example 2 was repeated except that 10 parts of 20 mesh crumb rubber was replaced by 10 parts of 40 mesh crumb rubber. The finer ground-up tire rubber used still tended to rapidly separate or sediment into a crumb rubber layer at the bottom of the vessel. The result is shown in Table IV.

Example 4

This Example illustrates the formation of a stable bitumen-ground rubber composition in accordance with the invention.

6 parts of the aromatic oil (Suntex 790) was mixed with 4 parts of asphalt (Bow River 85/100) at 150° C. To the asphalt were gradually added 10 parts of crumb rubber (20 mesh) and 0.8 part of polybutadiene rubber (Ricon 131, Colorado Chemical Specialities Inc. Microstructure 80% trans- and cis- 1,4, 20% 1,2-vinyl, molecular weight (Mw) =5,500) in sequence and mixed under high shear (with a Brinkman Polytron Mixer) at a temperature between 180° C. and 240° C. for 2 hours. To this stirred mixture was added 80 parts of additional asphalt (Bow River 85/100) and the resulting mixture was further mixed at 180° C. for 0.5 hour to form a stable ground tire rubberized asphalt composition. After 2 days storage at 140° C., the viscosity of the binder showed no appreciable change with respect to the binder before storage and essentially no difference between the top and bottom in the vessel, which indicated that the liquified rubber remained dispersed in the bitumen. The test data is shown in Table IV.

Example 5

Example 4 was repeated except that 6 parts of the crumb rubber were added to the bitumen along with the aromatic oil and the polybutadiene at first and mixed for 2 hours and then 4 parts of additional crumb rubber plus 0.2 part of elemental sulfur were incorporated into the mixture. 80 parts of additional asphalt was added to the high shear stirred mixture after dispersing the added crumb rubber for 15 to 20 min., when the viscosity of the mixture went obviously up. Some of the crumb rubber particles remained dispersed in the asphalt and the resulting asphalt composition stable after two days storage at 140° C. (see Table IV)

Example 6

The procedure of Example 4 was repeated, except that 1 part of sulfur was added after 2 hours mixing of the same crumb rubber as employed in Example 3 and mixed for one hour at 180° C. to form a gel-like material which was still readily dispersed and compatible with the asphalt, to produce a stable rubber asphalt binder with the same composition as in Example 4. The resulting asphalt rubber was quite stable at elevated temperature (see Table IV).

Example 7

The procedure of Example 4 was repeated, except that the mixture produced in Example 4 was treated with 1 part of sulfur at elevated temperature around 180° C. for one hour. The solubilized or devulcanized rubber in the asphalt composition was revulcanized in situ by the cross-linking reaction to form a smooth asphalt composition without phase separation. The resulting composition had an excellent stability. (see Table IV).

Example 8

This Example illustrates the incorporation of polyethylene into the stable asphalt-rubber crumb composition.

Example 4 was repeated except that 0.8 parts of liquid polybutadiene was replaced by 0.8 part of amine-terminated Poly(butadiene-co-acrylonitrile) (10% acrylonitrile, in liquid form, BP Goodrich, amine equivalent weight=879 g/mole). To the mixture produced, 1 part of maleic anhydride grafted polyethylene (Dupont Fusabond D-110, density at 25° C.=0.920 g/mol, melt index—40) and 0.8part of sulfur were added in order and mixed at 180° C. in the Polytron high shear mixer for 1 hour. Then, 4 parts of recycled polyethylene (low density polyethylene, melt index, 5) were dispersed into the stirred mixture at 180° C. for 30 min., forming a homogeneous asphalt composition. The recycled polyethylene was stabilized in the crumb rubberized asphalt binders at elevated temperature, no phase separation from the bitumen of either the dispersed polyethylene particles or the crumb rubber phase was observed, as evidenced by microscopic observation on the sample after storage at 140° C. for 48 hours.

Example 9

The process of Example 8 was repeated except that the 10 parts of crumb rubber which had been solubilized or devulcanized during mixing process described in Example 4 were omitted. The resulting composition was unstable against polyethylene coalescence from asphalt at elevated temperature, as evidenced by the microscopic observation as described in Example 8.

TABLE IV

| Component, phr | Example | | | | | | |
|---|---|---|---|---|---|---|---|
| | 2 | 3 | 4 | 5 | 6 | 7 | 8 |
| Asphalt (Bow River 85/100) | 64 | 64 | 84 | 84 | 84 | 64 | 84 |
| Suntex 790 | 6 | 6 | 6 | 6 | 6 | 6 | 6 |
| Crumb rubber | 10 | 10 | 10 | 10 | 10 | 10 | 10 |
| Liquid Polybutadiene | — | — | 0.8 | 0.8 | 0.8 | 0.8 | — |
| Sulfur | — | — | — | 0.2 | 1.0 | 1.0 | 0.8 |
| Maleic Anhydride-g-polyethylene | — | — | — | — | — | — | 1.0 |
| ATBN rubber | — | — | — | — | — | — | 0.8 |
| Recycled Polyethylene | — | — | — | — | — | — | 4 |
| Viscosity (CP)*, Brookfield at 135° C., 20 rpm | | | | | | | |
| at Top Section | 545 | 675 | 537.5 | 575 | 667.5 | 900 | — |
| at Bottom | 2975 | 3100 | 555 | 650 | 675 | 837 | — |
| Stability | No | No | VG | VG | VG | VG | VG |

Note: VG = Very Good
Viscosity of the crumb-asphalt binders after storage at 140° C. for 46 hours.

We claim:

1. A method for forming a bitumen composition, which comprises:
   mixing rubber vulcanate particles with a hydrocarbon oil to effect softening and swelling of the rubber vulcanate particles,
   applying thermal energy and mechanical energy to said softened and swollen particles to effect at least partial dissociation of a rubber vulcanate network of the rubber vulcanate particles,
   dispersing said at least partially dissociated rubber vulcanate network in bitumen having at least one compatibilizing agent therein sufficient to incorporate treated rubber from said at least partially dissociated rubber vulcanate into said bitumen, and
   effecting said thermal energy and mechanical energy application step until the rubber vulcanate particles have become dissociated to the extent that there is no discernible dispersed phase of rubber vulcanate particles as determined by the absence of sedimentation of rubber vulcanate particles after storage of said bitumen composition at 140° C. for 2 days.

2. The method of claim 1 wherein said dispersing of said at least partially dissociated rubber vulcanate network in bitumen is effected by effecting said mixing and energy application steps in bitumen.

3. The method of claim 2 wherein said hydrocarbon oil is provided by components inherently present in said bitumen and/or said dissociated rubber vulcanate.

4. The method of claim 2 wherein said hydrocarbon oil is provided by a hydrocarbon oil added to said bitumen prior to said mixing step.

5. The method of claim 4 wherein said rubber particles are crumb rubber particles from automobile tires.

6. The method of claim 5 wherein said hydrocarbon oil is one having aromaticity.

7. The method of claim 6 wherein said compatibilizing agent is a liquid rubber capable of compatibilizing said bitumen and liquid products of said dissociation process step at bitumen processing conditions of about 100° to about 300° C.

8. The method of claim 7 wherein said liquid rubber has a molecular weight of about 300 to about 60,000.

9. The method of claim 8 wherein said liquid rubber is polybutadiene or a polybutadiene-based copolymer.

10. The method of claim 7 wherein said liquid rubber is employed in an amount of about 0.01 to about 10 wt % of the bitumen.

11. The method of claim 10 wherein said liquid rubber is used in an amount of about 0.1 to about 3 wt %.

12. The method of claim 9 wherein said polybutadiene is an amine-functionalized polybutadiene.

13. The method of claim 1 including cross-linking by means of a cross-linking agent, said compatibilizing agent, bitumen and dissociated rubber particles.

14. The method of claim 1, wherein further rubber vulcanate particles are added to the composition resulting from said method and, optionally, cross-linking is effected to stabilize said further rubber vulcanate particles, with or without partial dissociation thereof in said composition, against separation from the bitumen.

15. The method of claim 1, wherein a polyolefin is dispersed in the bitumen composition resulting from said method and the dispersed polyolefin particles are stabilized against separation by progressive coalescing by steric stabilization by said dissociated rubber vulcanate network.

16. The method of claim 1 wherein said energy application step is effected for a time which results in any carbon black particles released from the rubber particles remaining dispersed and resistant to sedimentation after storage of said bitumen composition at 140° C. for 2 days.

17. The method of claim 14 wherein said energy application step is effected to provide partial dissociation of the further rubber vulcanate particles, and wherein said cross-linking step is effected to stabilize the dissociated further rubber vulcanate particles against separation from said bitumen.

18. The method of claim 17 wherein said cross-linking agent is sulfur, a sulfur donor or sulfur and accelerator.

19. The method of claim 18 wherein said cross-linking agent is employed in an amount of about 0.05 to about 0.5 wt %.

20. The method of claim 19 wherein said cross-linking agent is employed in an amount of about 0.2 to about 3 wt. %.

21. The method of claim 17 which is carried out to form a bituminous composition which contains about 25 to about 80 wt % dispersed stabilized rubber for use as a masterbatch for dilution with a further quantity of bitumen to form a bituminous composition for asphalt applications.

22. The method of claim 21 wherein said masterbatch is compounded with other bituminous composition components, including fillers and polymers, and the compounded composition is pelletized to produce a pelletized composition.

23. The method of claim 17 which is carried out to form a bituminous composition for utilization in asphalt applications.

24. The method of claim 17, wherein a functionalized monomer is incorporated into the bitumen composition.

25. A method for forming a bitumen composition, which comprises:

mixing rubber vulcanate particles with a hydrocarbon oil to effect softening and swelling of rubber particles, applying thermal energy and mechanical energy to said softened and swollen particles to effect at least partial dissociation of a rubber vulcanate network of the rubber vulcanate particles, dispersing said at least partially dissociated rubber vulcanate network in bitumen having at least one compatibilizing agent in said bitumen sufficient to incorporate treated rubber from said at least partially dissociated rubber vulcanate into said bitumen, effecting one or more additional incremental loadings of rubber vulcanate particles to the at least partially dissociated rubber vulcanate network-containing particles and effecting said thermal energy and mechanical energy application step on each such additional incremental loading of rubber particles to effect at least partial dissociation of a rubber vulcanate network thereof, and effecting said thermal energy and mechanical energy application step until all the rubber vulcanate particles have become dissociated to the extent that there is no discernible dispersed phase of rubber vulcanate particles as determined by the absence of sedimentation of rubber vulcanate particles after storage of said bitumen composition at 140° C. for 2 days.

26. The method of claim 25 wherein said one or more additional incremental loadings of rubber particles is effected to provide a loading of treated rubber of about 25 to about 80 wt %.

27. The method of claim 25 wherein said dispersing of said at least partially dissociated rubber vulcanate network in bitumen is effected by effecting said mixing and energy application steps in bitumen.

28. The method of claim 27 wherein said rubber particles are crumb rubber particles from automobile tires.

29. The method of claim 28 wherein said hydrocarbon oil is one having aromaticity.

30. The method of claim 29 wherein said compatibilizing agent is a liquid rubber capable of compatibilizing said bitumen and liquid products of said dissociation process step at bitumen processing conditions of about 100° to about 300° C.

31. The method of claim 30 wherein said liquid rubber has a molecular weight of about 300 to about 60,000.

32. The method of claim 31 wherein said liquid rubber is polybutadiene or a polybutadiene-based copolymer.

33. The method of claim 31 wherein said liquid rubber is employed in an amount of about 0.01 to about 10 wt % of the bitumen.

34. The method of claim 33 wherein said liquid rubber is used in an amount of about 0.1 to about 3 wt %.

35. The method of claim 32 wherein said polybutadiene is an amine-functionalized polybutadiene.

36. A bituminous composition, comprising:

a continuous bitumen phase, a dispersed phase comprising treated rubber having a dissociated rubber vulcanate network dissociated to the extent there are no discernible dispersed rubber particles as determined by the absence of sedimentation of rubber particles from the bitumen and composition upon storage of said bituminous composition at 140° C. for 2 days, and a compatabilization agent.

37. The bituminous composition of claim 36 further comprising a liquid rubber and additional rubber particles dispersed in said bitumen phase and stabilized against separation by sedimentation from said bitumen phase by cross-linking between said liquid rubber, bitumen and dissociated rubber vulcanate network.

38. The bituminous composition of claim 37 wherein said dispersed rubber particles are at least partially dissociated to an at least partially dissociated rubber vulcanate network.

39. The bituminous composition of claim 36 further comprising a liquid rubber and polyolefin particles dispersed in said bitumen and stabilized against separation by progressive coalescence from said bitumen phase by cross-linking between said liquid rubber, bitumen and dissociated rubber vulcanate network.

40. The bituminous composition of claim 37, 38 or 39 wherein said liquid rubber comprises a polybutadiene having a molecular weight of about 300 to about 60,000 and said cross-linking is effected using sulfur.

41. The bituminous composition of claim 40 wherein said polybutadiene is an amine-terminated polybutadiene.

* * * * *